(12) United States Patent
Jayasuriya et al.

(10) Patent No.: US 11,794,683 B2
(45) Date of Patent: Oct. 24, 2023

(54) ROOF MOUNTED AIRBAG FOR PROTECTION OF FRONT ROW MID AND OUTBOARD PASSENGERS IN FRONTAL, OFFSET, AND OBLIQUE CRASH MODES

(71) Applicants: Ford Global Technologies, LLC, Dearborn, MI (US); AUTOLIV ASP, INC., Ogden, UT (US)

(72) Inventors: Mangala Jayasuriya, Bloomfield Hills, MI (US); David W. Schneider, Clarkston, MI (US); Frank J. Herzenstiel, Davisburg, MI (US)

(73) Assignees: Ford Global Technologies, LLC, Dearborn, MI (US); AutoLiv Asp, Inc., Ogden, UT (US)

( * ) Notice: Subject to any disclaimer, the term of this patent is extended or adjusted under 35 U.S.C. 154(b) by 0 days.

(21) Appl. No.: 17/937,872

(22) Filed: Oct. 4, 2022

(65) Prior Publication Data
US 2023/0028184 A1    Jan. 26, 2023

Related U.S. Application Data

(63) Continuation of application No. 17/221,659, filed on Apr. 2, 2021, now Pat. No. 11,498,508.

(51) Int. Cl.
*B60R 21/214* (2011.01)
*B60R 21/232* (2011.01)
*B60R 21/231* (2011.01)

(52) U.S. Cl.
CPC .......... *B60R 21/214* (2013.01); *B60R 21/232* (2013.01); *B60R 2021/23161* (2013.01)

(58) Field of Classification Search
CPC ........ B60R 21/214; B60R 2021/23161; B60R 21/233; B60R 21/231; B60R 2021/23107; B60R 2021/23192; B60R 2021/23308; B60R 21/262; B60R 2021/26058; B50R 21/232

See application file for complete search history.

(56) References Cited

U.S. PATENT DOCUMENTS

| | | | |
|---|---|---|---|
| 3,897,961 A | 8/1975 | Leising et al. | |
| 5,470,103 A * | 11/1995 | Vaillancourt | ......... B60R 21/232 280/730.2 |
| 6,283,500 B1 * | 9/2001 | Eckert | ................... B60R 21/232 280/743.1 |
| 6,966,579 B2 | 11/2005 | Schneider et al. | |
| 7,000,944 B2 | 2/2006 | Bakhsh et al. | |
| 7,029,030 B2 | 4/2006 | Amamori | |

(Continued)

FOREIGN PATENT DOCUMENTS

| | | |
|---|---|---|
| CN | 102862543 B | 3/2015 |
| DE | 102012006511 A1 | 10/2013 |

*Primary Examiner* — Paul N Dickson
*Assistant Examiner* — Tiffany L Webb
(74) *Attorney, Agent, or Firm* — Frank A. MacKenzie; Bejin Bieneman PLC

(57) ABSTRACT

The present disclosure describes a roof-mounted airbag apparatus in a vehicle. The vehicle includes a roof, an instrument panel, and two passenger seats in a front row. The airbag apparatus includes an inflator and an airbag that is fluidly coupled to the inflator. The airbag is inflatable and deployable from the roof in an interior of the vehicle between the passenger seats and the instrument panel, and includes a cavity.

20 Claims, 19 Drawing Sheets

(56) References Cited

U.S. PATENT DOCUMENTS

| | | | |
|---|---|---|---|
| 7,195,276 B2 | 3/2007 | Higuchi | |
| 7,364,185 B2 | 4/2008 | Mori et al. | |
| 7,549,669 B2 | 6/2009 | Keshavaraj | |
| 8,579,321 B2 * | 11/2013 | Lee | B60R 21/233 |
| | | | 280/729 |
| 8,807,593 B2 * | 8/2014 | Lee | B60R 21/213 |
| | | | 280/730.1 |
| 8,851,509 B1 * | 10/2014 | Choi | B60R 21/214 |
| | | | 493/405 |
| 9,150,187 B1 | 10/2015 | Schiftan et al. | |
| 9,446,735 B1 | 9/2016 | Jayasuriya et al. | |
| 9,676,361 B2 * | 6/2017 | Smith | B60R 21/231 |
| 10,266,145 B2 * | 4/2019 | Paxton | B60R 21/2338 |
| 10,272,868 B2 | 4/2019 | Jaradi et al. | |
| 10,279,770 B2 * | 5/2019 | Faruque | B60R 21/237 |
| 10,315,609 B2 | 6/2019 | Thomas | |
| 10,471,923 B2 | 11/2019 | Jimenez et al. | |
| 10,583,799 B2 * | 3/2020 | Schneider | B60R 21/2338 |
| 10,625,701 B2 * | 4/2020 | Cho | B60R 21/214 |
| 11,040,687 B2 | 6/2021 | Jayakar et al. | |
| 11,383,669 B2 * | 7/2022 | Schneider | B60R 21/2338 |
| 11,498,508 B2 * | 11/2022 | Jayasuriya | B60R 21/2346 |

\* cited by examiner

ROOF MOUNTED AIRBAG FOR PROTECTION OF FRONT ROW MID AND OUTBOARD PASSENGERS IN FRONTAL, OFFSET, AND OBLIQUE CRASH MODES

CROSS-REFERENCE TO RELATED APPLICATION

This application is a continuation of and claims priority to U.S. patent application Ser. No. 17/221,659, filed on Apr. 2, 2021, which is hereby incorporated by reference in its entirety.

BACKGROUND

Technical Field

The present disclosure generally relates to safety restraint systems.

Description of the Related Art

In certain vehicles, a front row includes a driver seat and two front passenger seats adjacent to the driver seat. It may be desirable to extend coverage of a safety restraint system, e.g., an airbag, to cover front row passengers.

BRIEF SUMMARY

The present disclosure describes a roof-mounted airbag apparatus having an inflatable and deployable airbag that may provide extended coverage to front row-seated passengers, with efficient, robust, and compact form factors.

For example, in one example, non-limiting embodiment, a vehicle of the present disclosure includes a roof, an instrument panel, a seat, and an airbag apparatus mounted in the roof. The airbag apparatus has an inflator and an airbag that is fluidly coupled to the inflator. The airbag is inflatable and deployable from the roof in an interior of the vehicle between the seat and the instrument panel. The airbag, when deployed and inflated, has an outer periphery and a cavity that extends through the airbag.

For example, in another example, non-limiting embodiment, a system includes a vehicle roof, an inflator, a diffuser tube, and an airbag fluidly coupled to the inflator via the diffuser tuber. The airbag is inflatable and deployable from the roof. The airbag, when deployed and inflated, has an outer periphery and a cavity that extends through the airbag.

For example, in another example, non-limiting embodiment, an airbag is deployable from a vehicle roof. The airbag, when inflated, includes an outer periphery defined by a lateral width and a longitudinal width. The airbag also includes a cavity that extends through the airbag.

BRIEF DESCRIPTION OF THE SEVERAL VIEWS OF THE DRAWINGS

For a better understanding of the embodiments, reference will now be made by way of example to the accompanying drawings. In the drawings, identical reference numbers identify similar elements or acts. The sizes and relative positions of elements in the drawings are not necessarily drawn to scale. For example, some of these elements may be enlarged and positioned to improve drawing legibility.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with vehicles have not been shown or described in detail to avoid unnecessarily obscuring descriptions of the embodiments.

Figure 1:
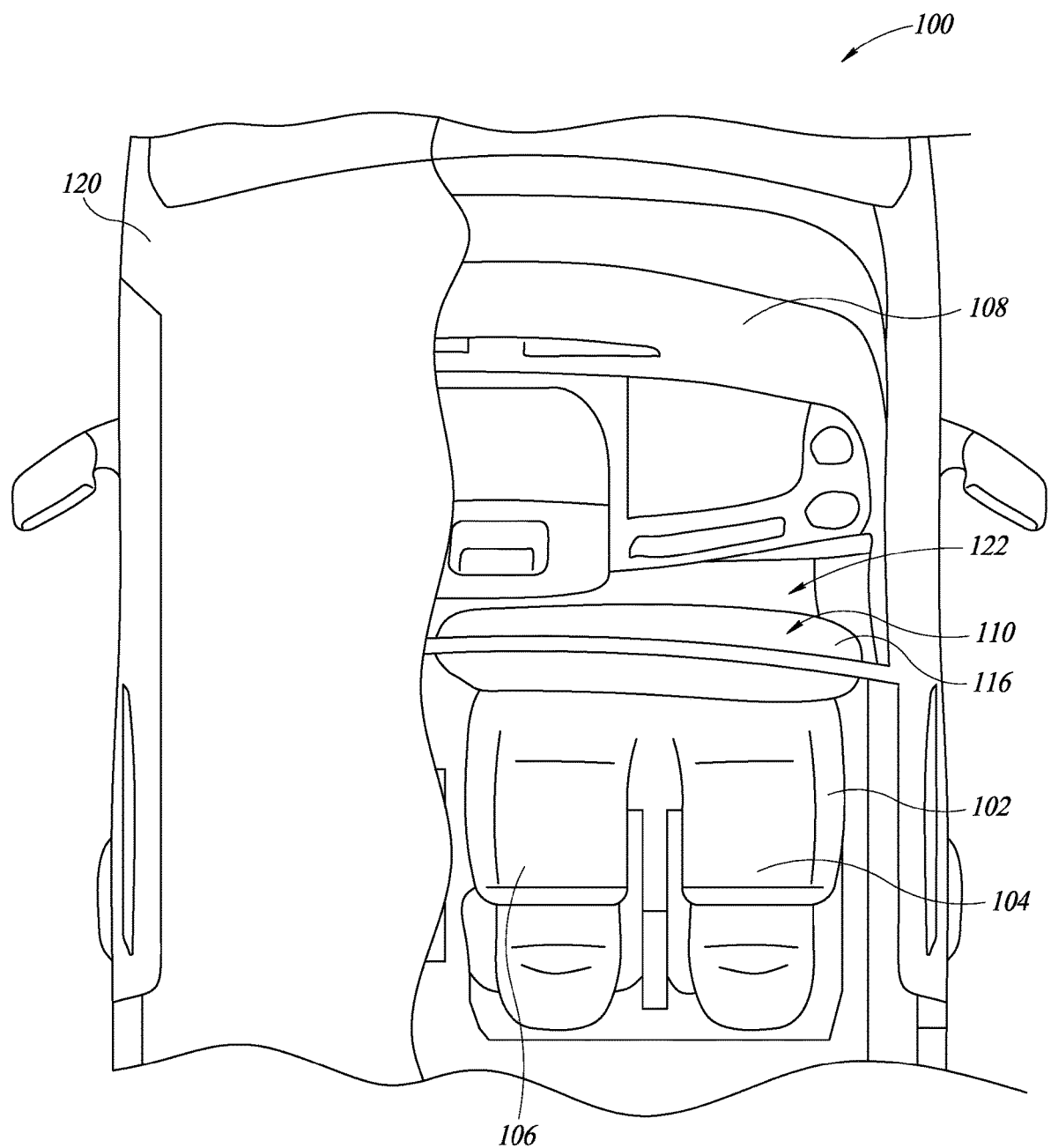
FIG. 1 is a partial cutaway plan view of a vehicle according to an embodiment of the present disclosure.
Figure 2:
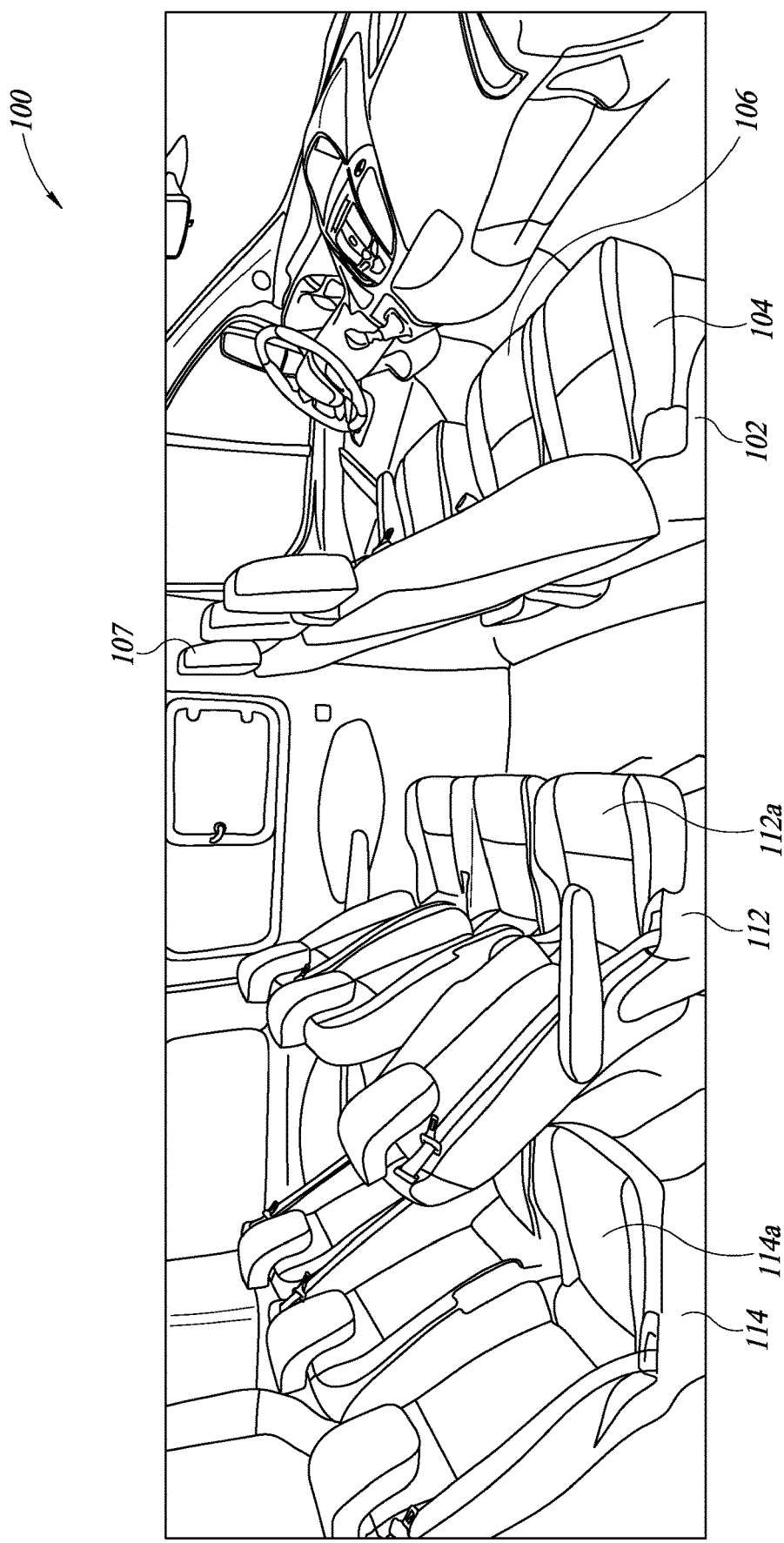
FIG. 2 is a side isometric view of the vehicle of FIG. 1.

FIG. 1 is a partial, breakaway top view of a vehicle 100 according to an embodiment of the present disclosure. The vehicle 100 may be, for example, a transit vehicle. The vehicle 100 includes a roof 120, shown partially only for clarity of description and illustration. The vehicle 100 includes a front row 102 that has a first passenger seat 104, a second passenger seat 106, and a driver seat 107 (FIG. 2). The vehicle 100 includes an instrument panel 108 adjacent to the front row 102. The vehicle 100 also includes an airbag apparatus 110 that is mounted on the roof 120 of the vehicle 100 that includes an airbag 116 that is deployable to provide coverage to the first passenger seat 104 and the second passenger seat 106.

FIG. 2 is a partial, side isometric view of the vehicle 100. As illustrated in FIG. 2, the vehicle 100, in some embodiments, may include a second row 112 and a third row 114 in addition to the front row 102. The second row 112 includes a plurality of seats 112a that are positioned behind the front sitting row 102. Similarly, the third row 114 includes a plurality of seats 114a that are positioned behind the second row 112. Although FIG. 1 illustrates the airbag apparatus 110 including the airbag 116 that is deployable to provide coverage to the front row 102, in alternative embodiments, one or more airbag apparatuses 110 can be mounted on the roof 120 and deployable to provide coverage to the second row 112 and the third row 114.

Figure 3:
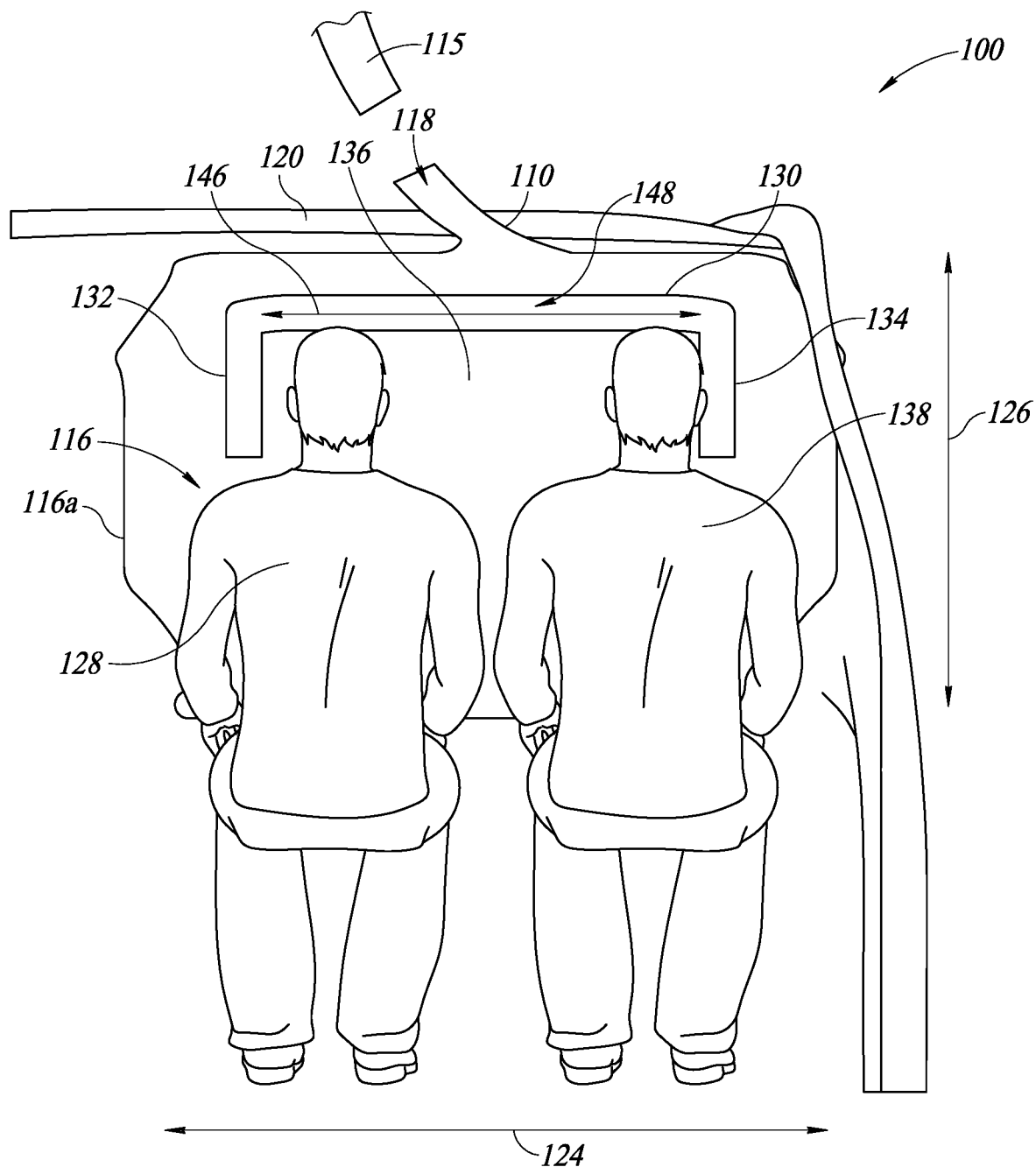
FIG. 3 is a partial rear view of the vehicle of FIG. 1 from an interior thereof illustrating a deployed airbag.
Figure 4:
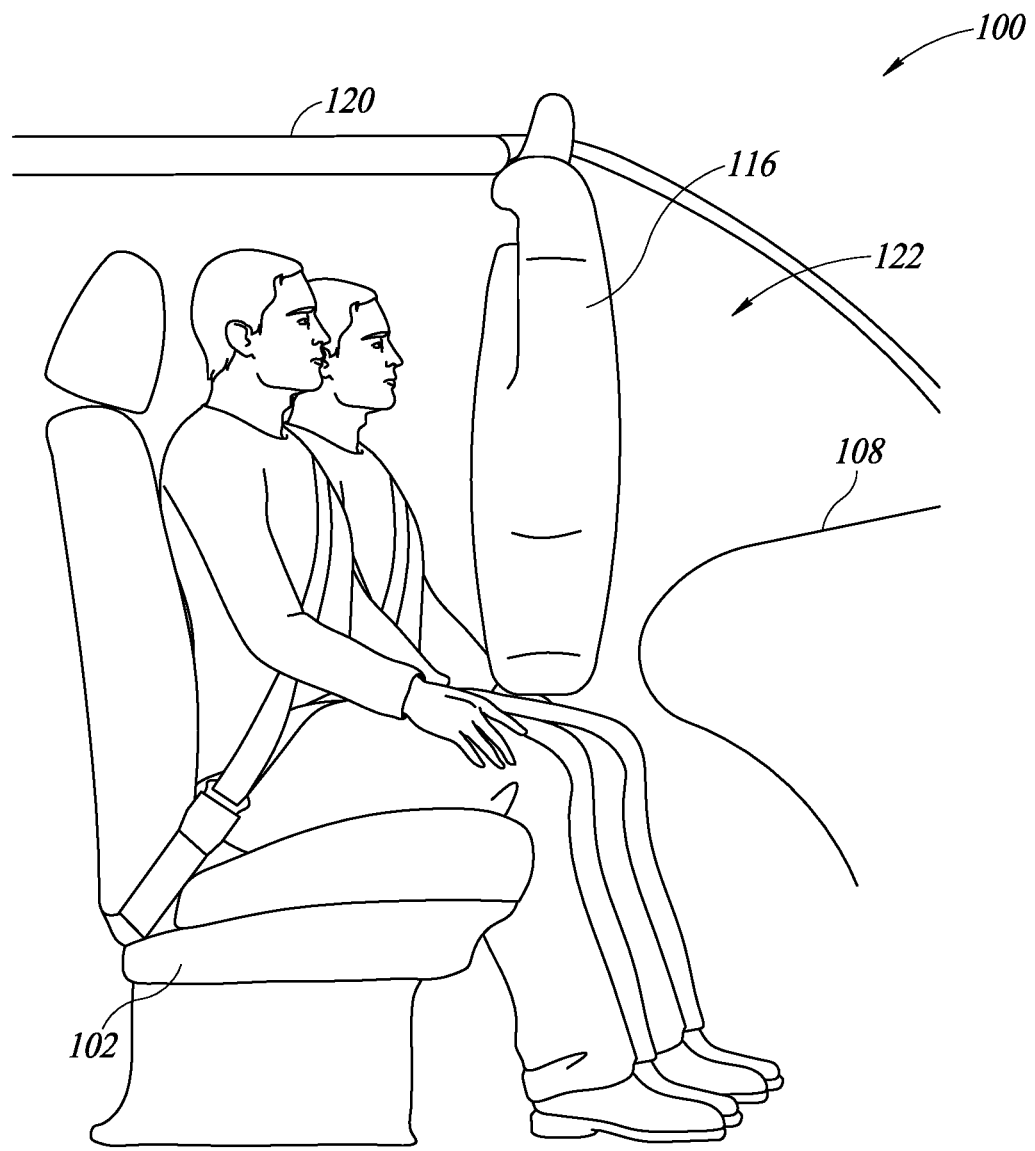
FIG. 4 is a partial side view of the vehicle of FIG. 3 illustrating the deployed airbag.

FIGS. 3 and 4 are, respectively, a partial rear view and a partial side view of the vehicle 100 from an interior thereof illustrating the deployed airbag 116. The airbag apparatus 110 includes an inflator 115 that is in fluid communication with an airbag inlet 118 of the airbag 116. The inflator 115, for example, may include a gas generating agent, which can generate an inflation gas for inflating the airbag 116 when detonated in response to detection of an impact event. In general, the airbag 116 can comprise a fabric or other suitable material, and is generally stored in a folded configuration. During an impact event, the inflation gas is fluidly communicated from the inflator 115 to the folded airbag 116 resulting in inflation and deployment.

The airbag 116 is inflatable and deployable from the roof 120 in an interior compartment 122 of the vehicle 100 between the instrument panel 108 and the front row 102. The interior compartment 122 may be defined as a space or region between the instrument panel 108 and the front row 102. The airbag 116, when deployed and inflated, is positioned within the interior compartment 122.

The airbag 116, when deployed and inflated, includes an outer periphery 116a and a cavity 148 extending through the airbag 116. The outer periphery 116a of the airbag 116 is defined by a lateral width 124 and a longitudinal width 126. In an embodiment, the lateral width 124 and the longitudinal width 126 of the airbag 116 provide the outer periphery 116a to cover a head, a torso, and a neck of a first occupant 128 and a second occupant 138 seated in the front row 102.

The cavity 148 is generally sized and shaped to mitigate impact on the first and second occupants 128, 138 when the airbag 116 is inflated and deployed. For example, upon impact of the first and second occupants 128, 138, the cavity 148 generally provides for the airbag 116 to move or flap in a hinged configuration. In this manner, the impact of the airbag 116 to the first and second occupants 128, 138 may be mitigated, restricted, or reduced. The cavity 148 includes a first portion 130, a second portion 132, and a third portion 134. The first portion 130 is a horizontal portion that extends parallel to the roof 120 along the lateral width 124 of the airbag 116. The second portion 132 and the third portion 134 are vertical portions extending perpendicular to the first portion 130 to define a central portion 136 of the airbag 116 that faces the heads of the first occupant 128 and the second occupant 138 when the airbag 116 is inflated and deployed.

The central portion 136 is generally located between the second portion 132 and the third portion 134.

Figure 5:
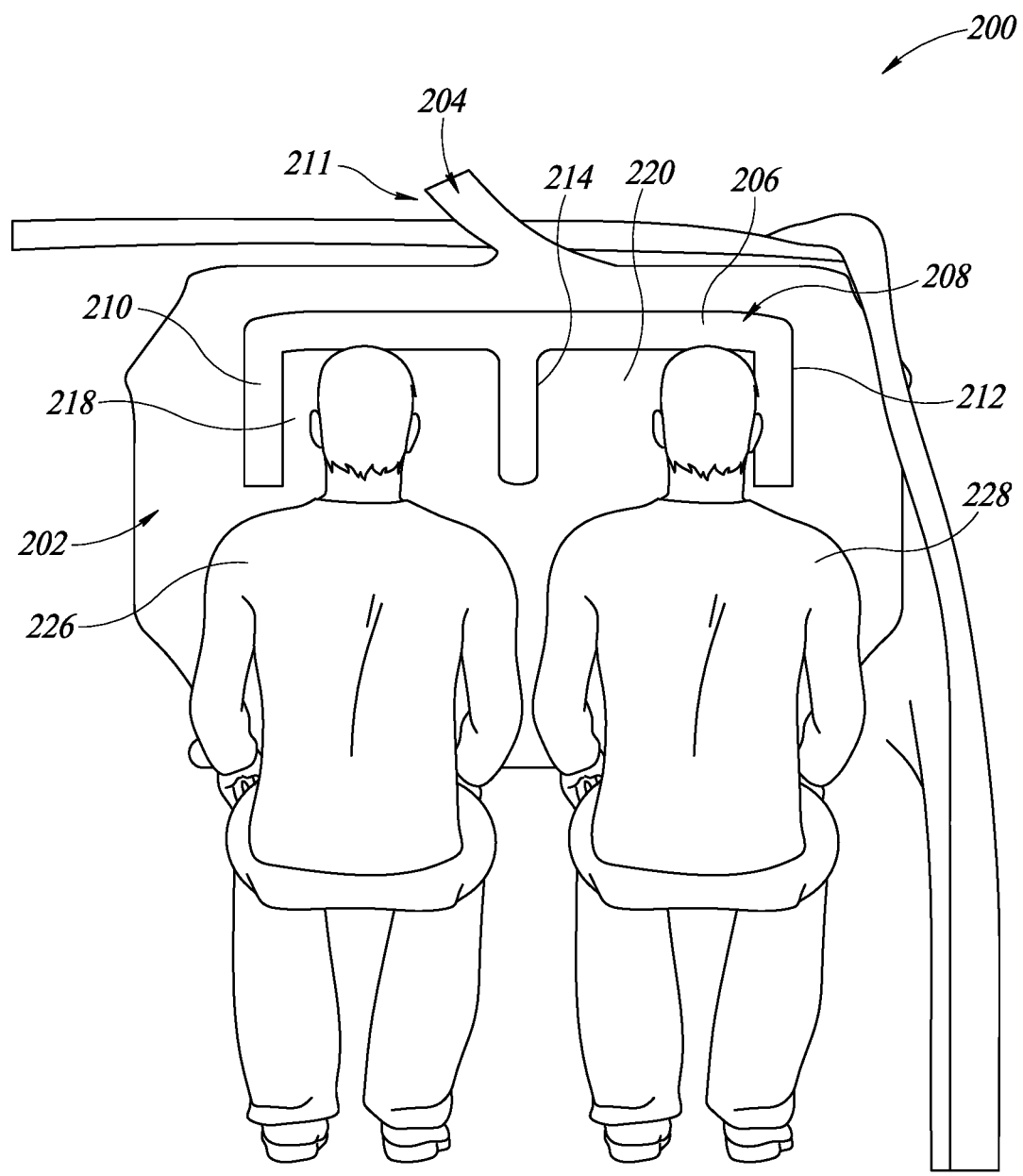
FIG. 5 is a partial rear view of a vehicle from an interior thereof illustrating a deployed airbag according to an embodiment of the present disclosure.

FIG. 5 is a partial rear view of a vehicle 200 from an interior thereof illustrating a deployed airbag 202. The vehicle 200 is generally similar to the vehicle 100, as described in FIGS. 3 and 4. For example, the vehicle 200 includes an airbag apparatus 211 having an inflator (not shown for clarity of description and illustration), an airbag 202 that is inflatable and deployable, an airbag inlet 204, and a cavity 206 having a first portion 208, a second portion 210, and a third portion 212. However, the airbag apparatus 211 provides certain variations. For example, the cavity 206 also includes a fourth portion 214 between the second portion 210 and the third portion 212. The fourth portion 214 extends perpendicular to the first portion 208, and parallel to both the second portion 210 and the third portion 212. The fourth portion 214 is a vertical portion extending perpendicularly to the first portion 208 to define a first central portion 218 and a second central portion 220. The first central portion 218 is positioned between the second portion 210 and the fourth portion 214. The second central portion 220 is positioned between the third portion 212 and the fourth portion 214. When the airbag 202 is deployed and inflated, the first central portion 218 generally faces the head of a first occupant 226 and the second central portion 220 generally faces the head of a second occupant 228.

Figure 6:
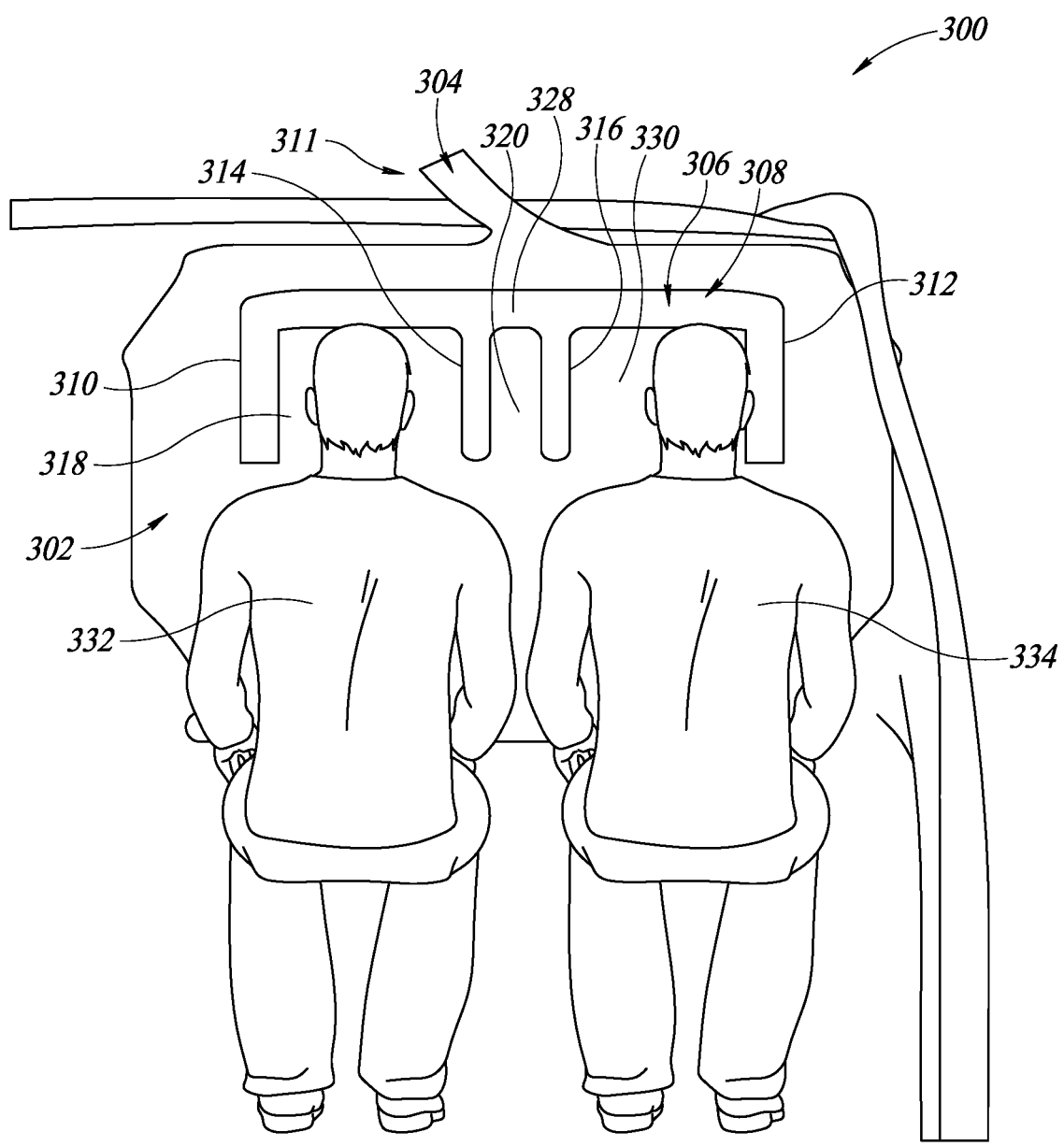
FIG. 6 is a partial rear view of a vehicle from an interior thereof illustrating a deployed airbag according to an embodiment of the present disclosure.

FIG. 6 is a partial rear view of a vehicle 300 from an interior thereof illustrating a deployed airbag 302. The vehicle 300 is generally similar to the vehicle 100, as described in FIGS. 3 and 4. For example, the vehicle 300 includes an airbag apparatus 311 having an inflator (not shown for clarity of description and illustration), an airbag 302 that is inflatable and deployable, an airbag inlet 304, and a cavity 306 having a first portion 308, a second portion 310, and a third portion 312. However, the airbag apparatus 311 provides certain variations. The cavity 306 also includes a fourth portion 314 and a fifth portion 316 that extend perpendicular to the first portion 308 and parallel to the second portion 310 and the third portion 312. The fourth portion 314 and the fifth portion 316 are vertical portions that project out of the first portion 308 and define a first central portion 318, a second central portion 330, and a center lip portion 320. The first central portion 318 is positioned between the second portion 310 and the fourth portion 314. The second central portion 330 is positioned between the third portion 312 and the fifth portion 316. The center lip portion 320 is positioned between the fourth portion 314 and the fifth portion 316.

When the airbag 302 is inflated and deployed, the first central portion 318 faces the head of a first occupant 332 and the second central portion 330 faces the head of a second occupant 334. The center lip portion 320 provides additional support to either of the first occupant 332 and the second occupant 334 in the event of an oblique impact in contrast to a full-frontal impact, or in the event either of the first occupant 332 or the second occupant 334 is slightly offset, during impact, from a nominal seating position. In particular, the first, second, third, fourth, and fifth portions 308, 310, 312, 314, 316 are arranged to provide a center region 328. The center region 328, in addition, or alternative, to the center lip portion 320 may also provide additional support in an oblique impact or if the first and second occupants 332, 334 are offset, during impact, from the nominal seating position, in which the first occupant 332 may face, in a frontal position, the first central portion 318, and the second occupant 334 may face, in a frontal position, the second central portion 330.

Figure 7:
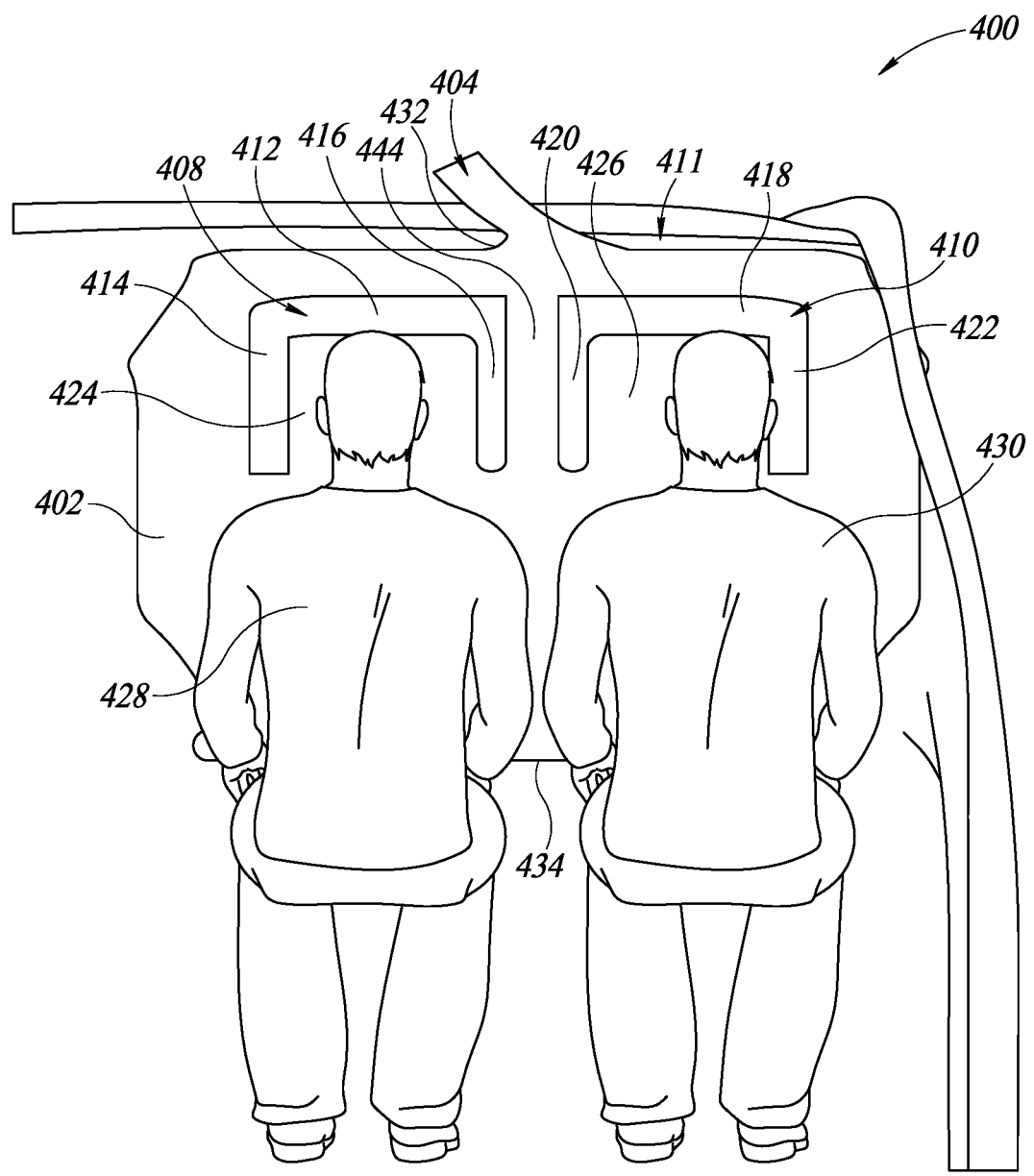
FIG. 7 is a partial rear view of a vehicle from an interior thereof illustrating a deployed airbag according to an embodiment of the present disclosure.

FIG. 7 is a partial rear view of a vehicle 400 from an interior thereof illustrating a deployed airbag 402. The vehicle 400 is generally similar to the vehicle 100 of FIGS. 3 and 4. The vehicle 400 includes an airbag apparatus 411 having an inflator (not shown for clarity of description and illustration), an airbag 402 that is inflatable and deployable, and an airbag inlet 404. However, the airbag apparatus 411 provides certain variations. For example, the airbag 402 includes a first cavity 408 and a second cavity 410. The first cavity 408 includes a horizontal portion 412, a first vertical portion 414, and a second vertical portion 416. The first vertical portion 414 and the second vertical portion 416 project out of the horizontal portion 412 to define a first central portion 424. Similarly, the second cavity 410 includes a horizontal portion 418, a first vertical portion 420, and a second vertical portion 422. The first vertical portion 420 and the second vertical portion 422 project out of the horizontal portion 418 to define a second central portion 426. The first central portion 424 faces the head of a first occupant 428 and the second central portion 426 faces the head of a second occupant 430. A longitudinal region 444 between the first cavity 408 and the second cavity 410 extends from an upper edge 432 of the airbag 402 to a lower edge 434 of the airbag 402, which can provide stability of the airbag 402 and additional support to the first occupant 428 and the second occupant 430 during impact.

Figure 8:
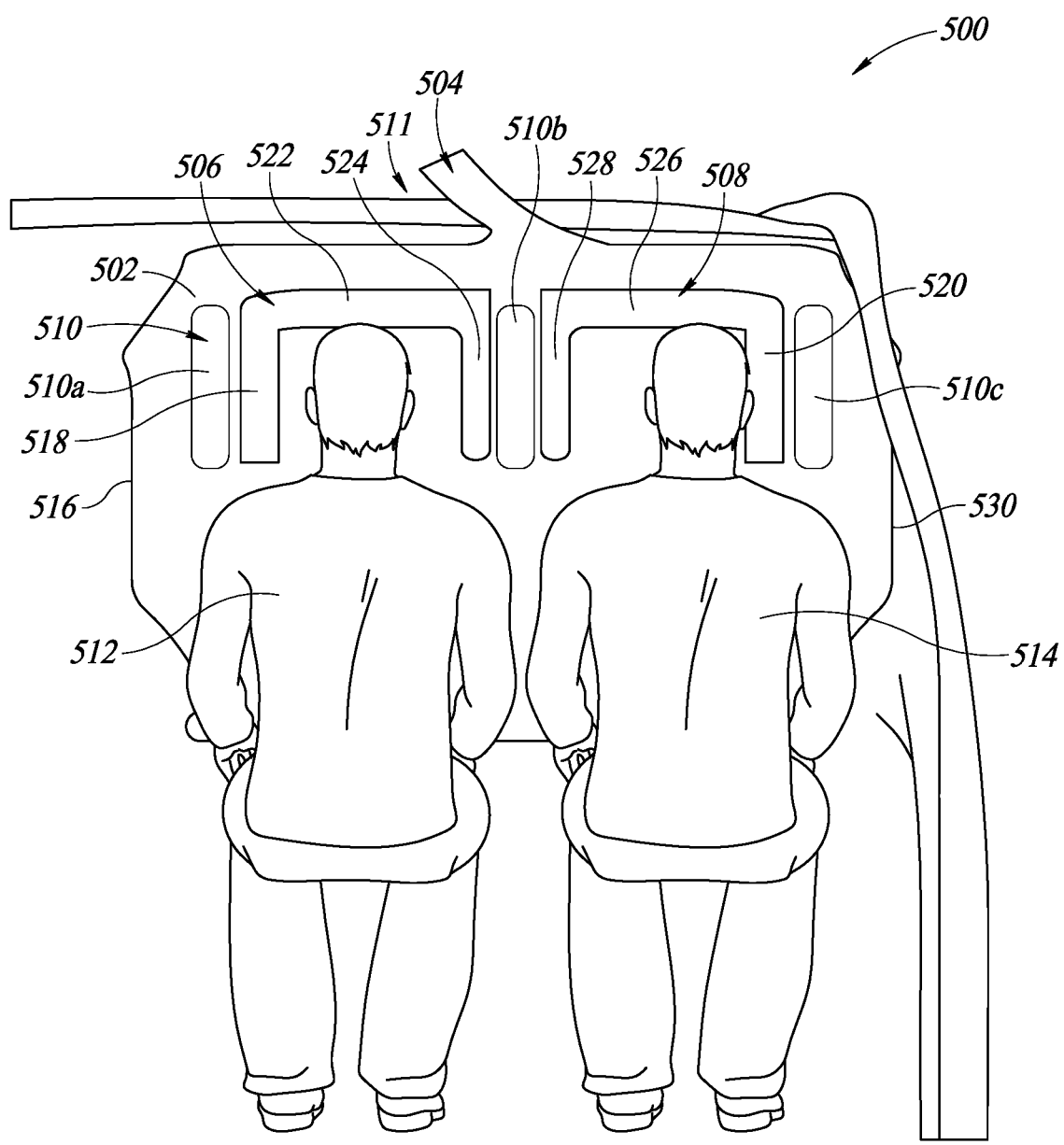
FIG. 8 is a partial rear view of a vehicle from an interior thereof illustrating a deployed airbag according to an embodiment of the present disclosure.
Figure 9:
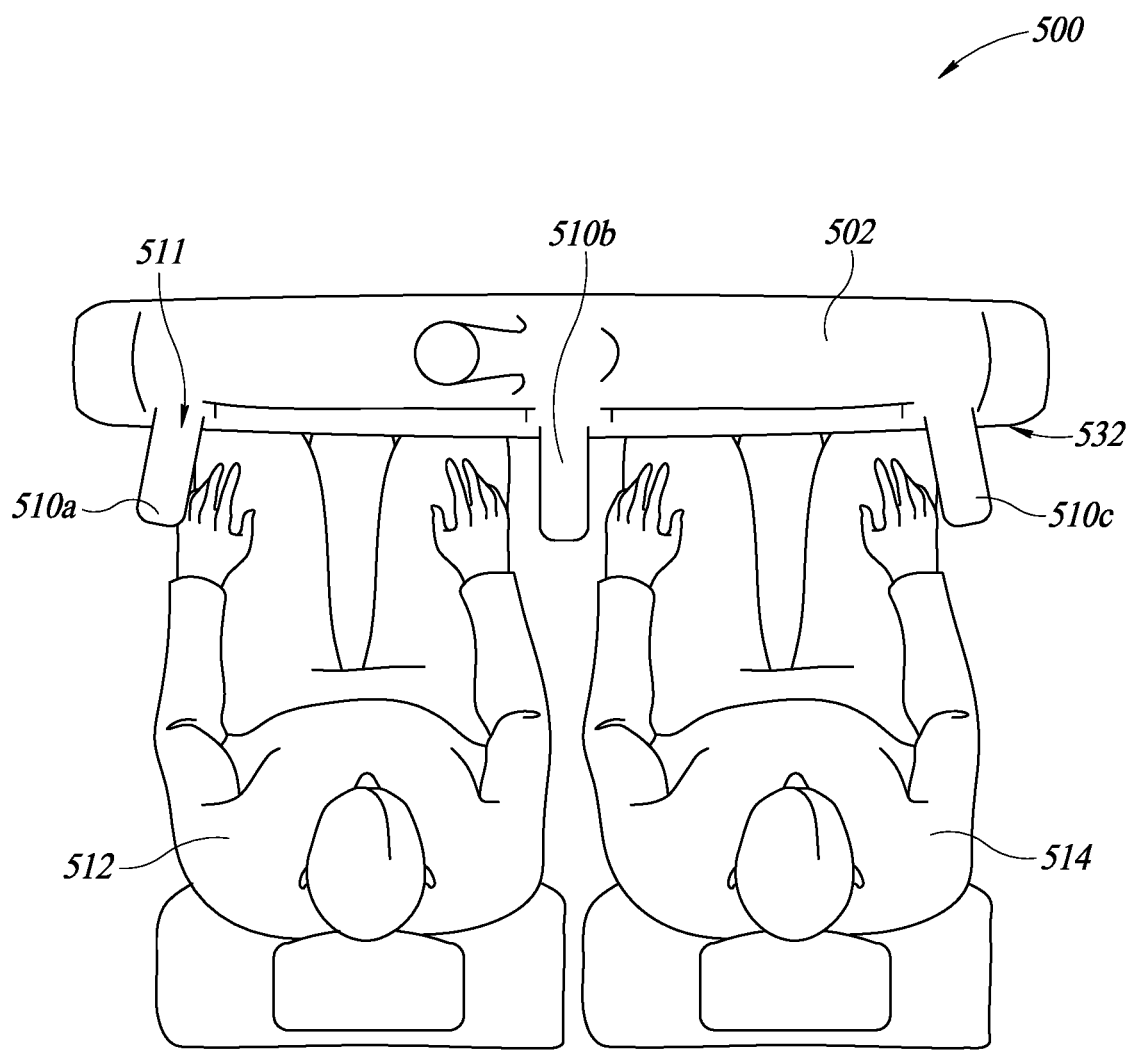
FIG. 9 is a partial top view of the vehicle from an interior thereof and a roof and an instrument panel removed for clarity of illustration and description, illustrating the deployed airbag of FIG. 8.

FIGS. 8 and 9 are a partial rear view and a partial top view of a vehicle 500, respectively, from an interior thereof illustrating a deployed airbag 502, with the roof 120 and the instrument panel 108 removed for clarity of illustration and description in FIG. 9. The vehicle 500 is generally similar to the vehicle 400 of FIG. 7. The vehicle 500 includes an airbag apparatus 511 having an inflator (not shown for clarity of description and illustration), an airbag 502 that is inflatable and deployable, an airbag inlet 504, a first cavity 506, and a second cavity 508. The first cavity 506 includes a horizontal portion 522, a first vertical portion 518, and a second vertical portion 524. The second cavity 508 includes a horizontal portion 526, a first vertical portion 528, and a second vertical portion 520. However, the airbag apparatus 511 provides certain variations. For example, the airbag apparatus 511 includes a plurality of lobes 510 that extend outwardly from the airbag 502 beyond an outer surface 532 of the airbag 502 toward a first occupant 512 and a second occupant 514.

The plurality of lobes 510 includes a first lobe 510a that is positioned between a first outer edge 516 of the airbag 502 and the first vertical portion 518 of the first cavity 506. The plurality of lobes 510 also includes a second lobe 510b that is positioned between the first cavity 506 and the second cavity 508. The first lobe 510a and the second lobe 510b may provide support to the first occupant 512 in the event of an oblique impact, or in the event the first occupant 512 is offset, during impact, from a nominal seating position. The plurality of lobes 510 also includes a third lobe 510c that is positioned between the second vertical portion 520 of the second cavity 508 and a second outer edge 530 of the airbag 502. The second lobe 510b and the third lobe 510c may provide support to the second occupant 514 in the event of an oblique impact, or in the event the second occupant 514 is offset, during impact, from the nominal position.

Figure 10:
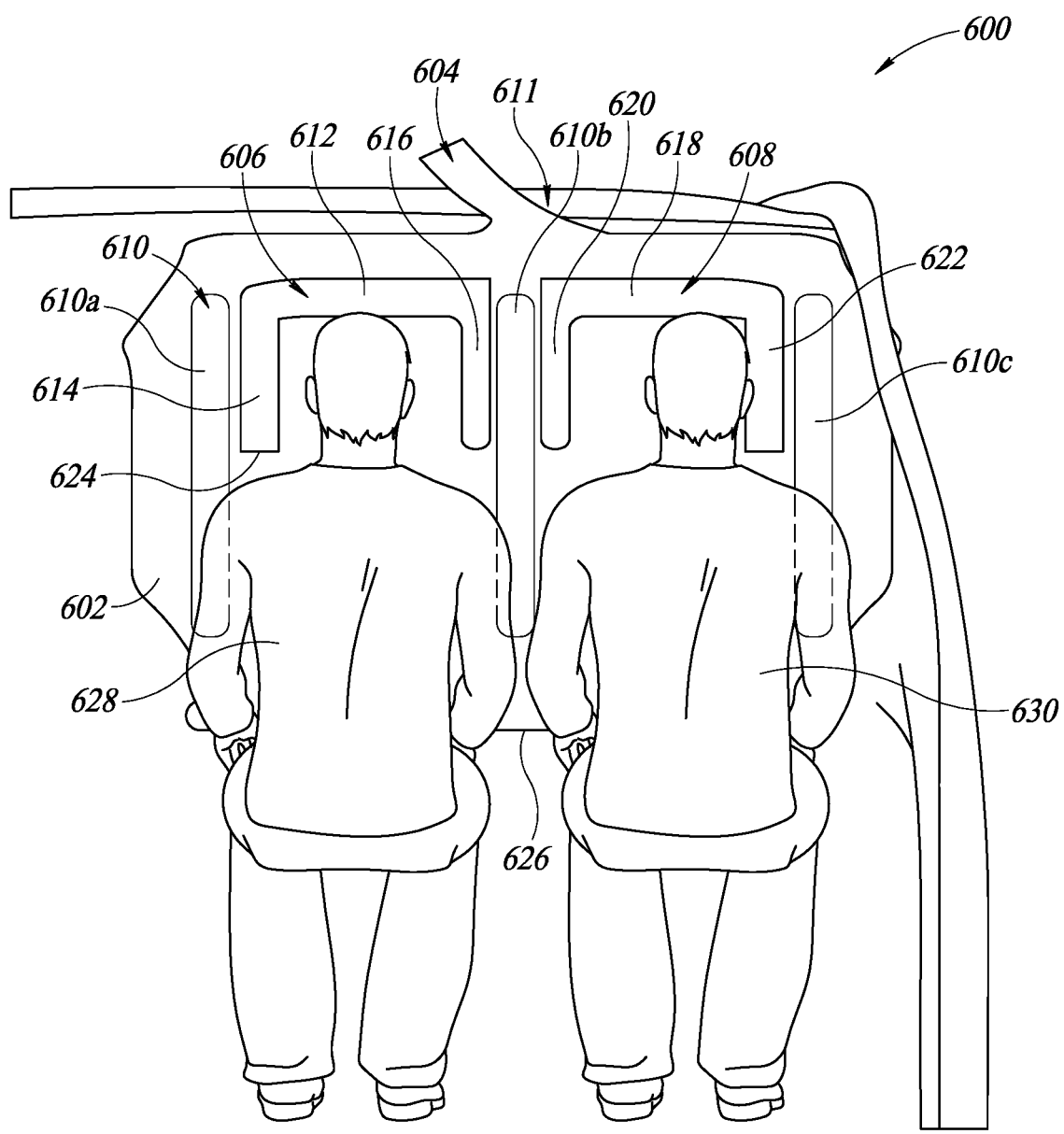
FIG. 10 is a partial rear view of a vehicle from an interior thereof illustrating a deployed airbag according to an embodiment of the present disclosure.

FIG. 10 is a partial rear view of a vehicle 600 from an interior thereof illustrating a deployed airbag 602. The vehicle 600 is generally similar to the vehicle 500 of FIGS. 8 and 9. The vehicle 600 includes an airbag apparatus 611 having an inflator (not shown for clarity of description and illustration), an airbag 602 that is inflatable and deployable, an airbag inlet 604, a plurality of lobes 610, e.g., a first lobe 610a, a second lobe 610b, and a third lobe 610c, a first cavity 606, and a second cavity 608. The first cavity 606 includes a horizontal portion 612, a first vertical portion 614, and a second vertical portion 616. The second cavity 608 includes a horizontal portion 618, a first vertical portion 620, and a second vertical portion 622. The airbag apparatus 611 provides certain variations. For example, each of plurality of lobes 610 is elongated such that each of the lobes 610 extends beyond a lower edge 624 of the first cavity 606 and the second cavity 608 toward a lower edge 626 of the airbag 602. The elongated lobes 610 may provide additional support to a first occupant 628 and a second occupant 630. In addition, the elongated lobes 610 may provide cushioning to the heads and torsos of the first occupant 628 and the second occupant 630 during impact.

Figure 11:
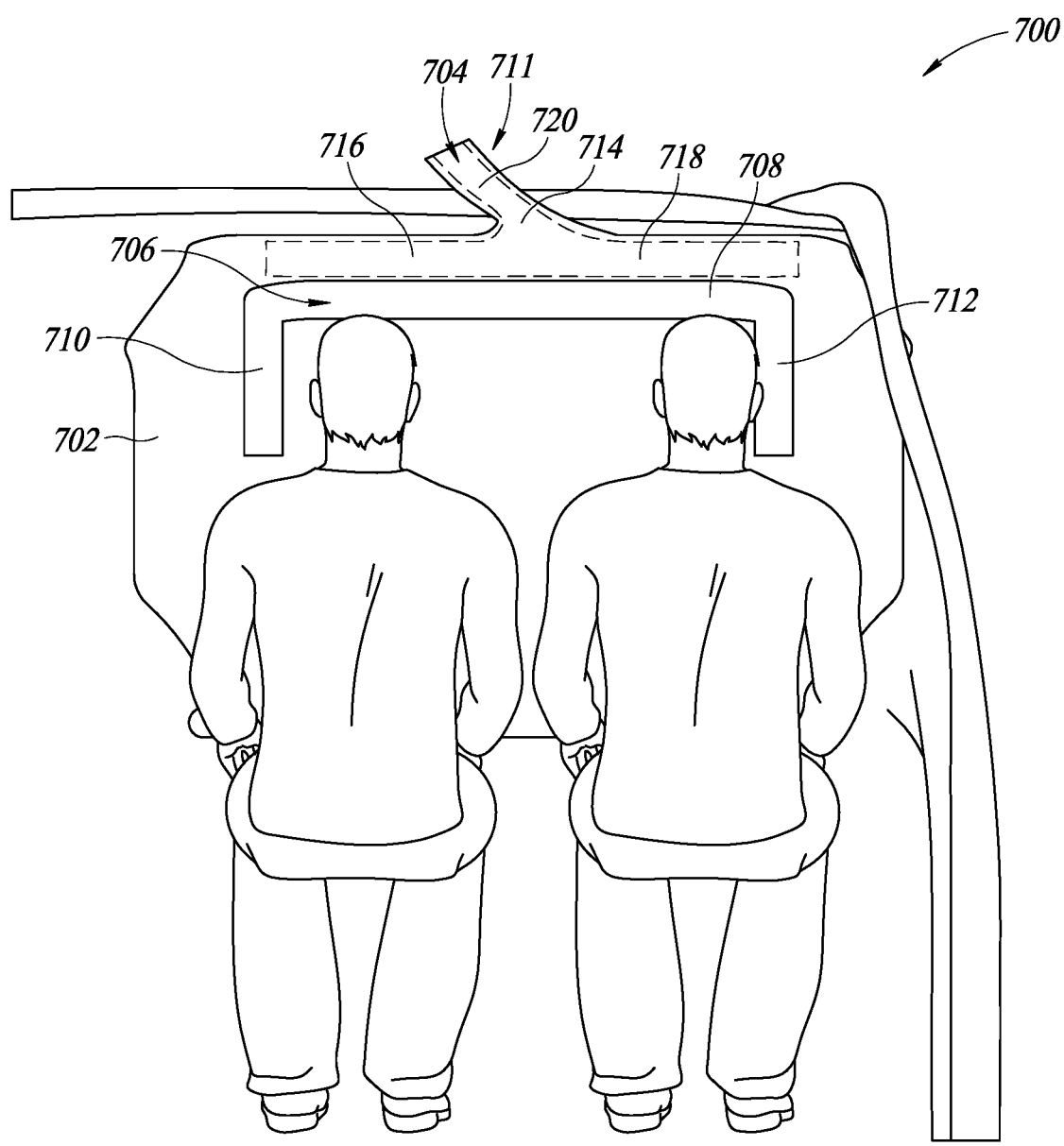
FIG. 11 is a partial rear view of a vehicle from an interior thereof illustrating a deployed airbag according to an embodiment of the present disclosure.
Figure 12:
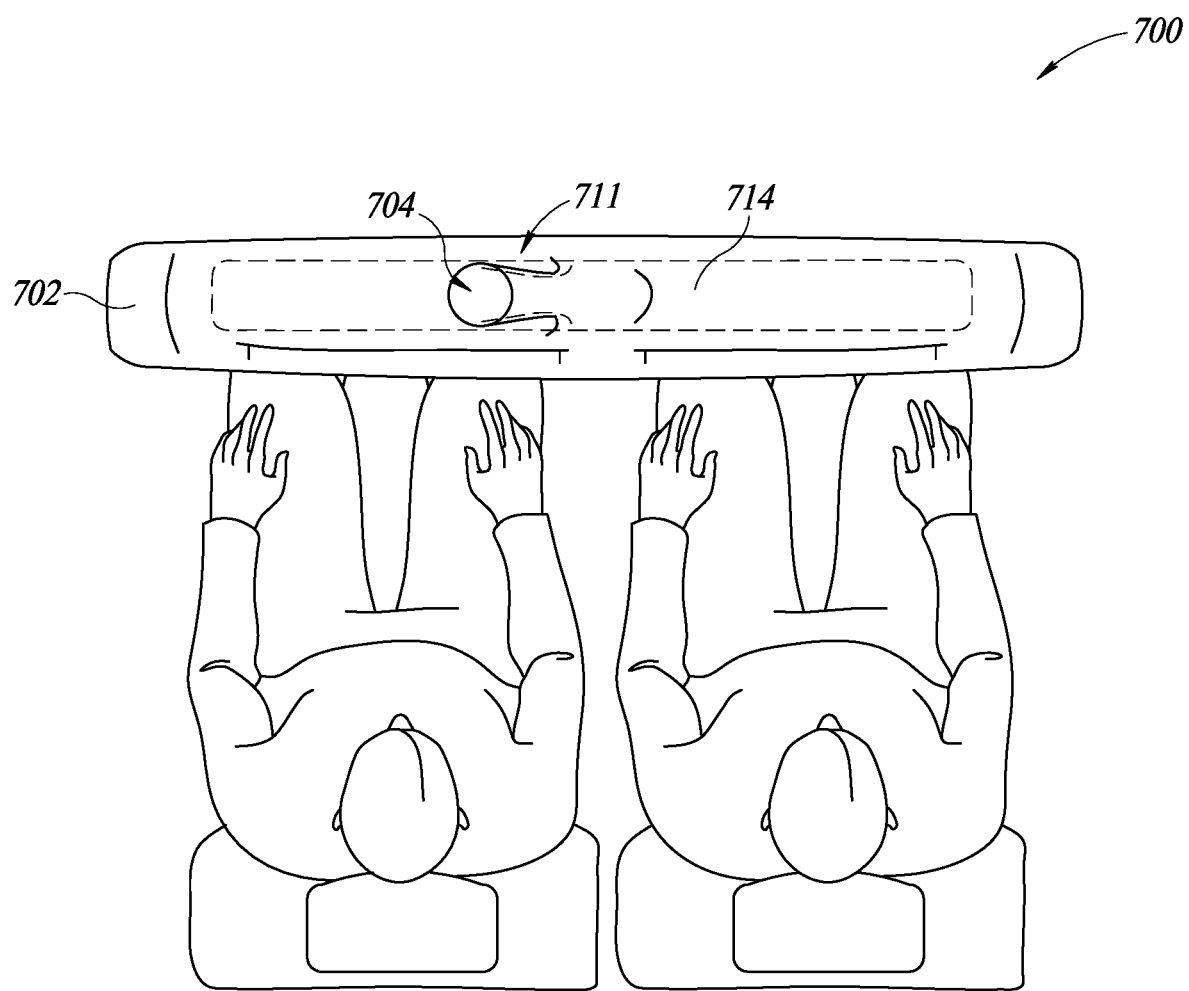
FIG. 12 is a partial top view of the vehicle from an interior thereof and a roof and an instrument panel removed for clarity of illustration and description, illustrating the deployed airbag of FIG. 11.

FIGS. 11 and 12 are a partial rear view and a partial top view of a vehicle 700, respectively, from an interior thereof illustrating a deployed airbag 702, with the roof 120 and the instrument panel 108 removed for clarity of illustration and description in FIG. 12. The vehicle 700 of FIGS. 11 and 12 is generally similar to the vehicle 100 of FIG. 3. The vehicle 700 includes an airbag apparatus 711 having an inflator (not shown for clarity of description and illustration), an airbag 702 that is inflatable and deployable, an airbag inlet 704, and a cavity 706 including a horizontal portion 708, a first vertical portion 710, and a second vertical portion 712. The vehicle 700 provides certain variations. For example, the airbag apparatus 711 includes a diffuser tube 714 that is configured to direct gas from the inflator to the airbag 702.

The diffuser tube 714 has a Y-shaped structure that includes a first tube portion 716, a second tube portion 718, and a third tube portion 720. The first tube portion 716 extends from the third tube portion 720 toward the first vertical portion 710 of the cavity 706. The second tube portion 718 extends from the third tube portion 720 toward the second vertical portion 712 of the cavity 706. The diffuser tube 714 is generally sized, shaped, and arranged to facilitate uniform distribution of gas to the airbag 702. The airbag 702 is fluidly coupled to the inflator via the diffuser tube 714.

Figure 13:
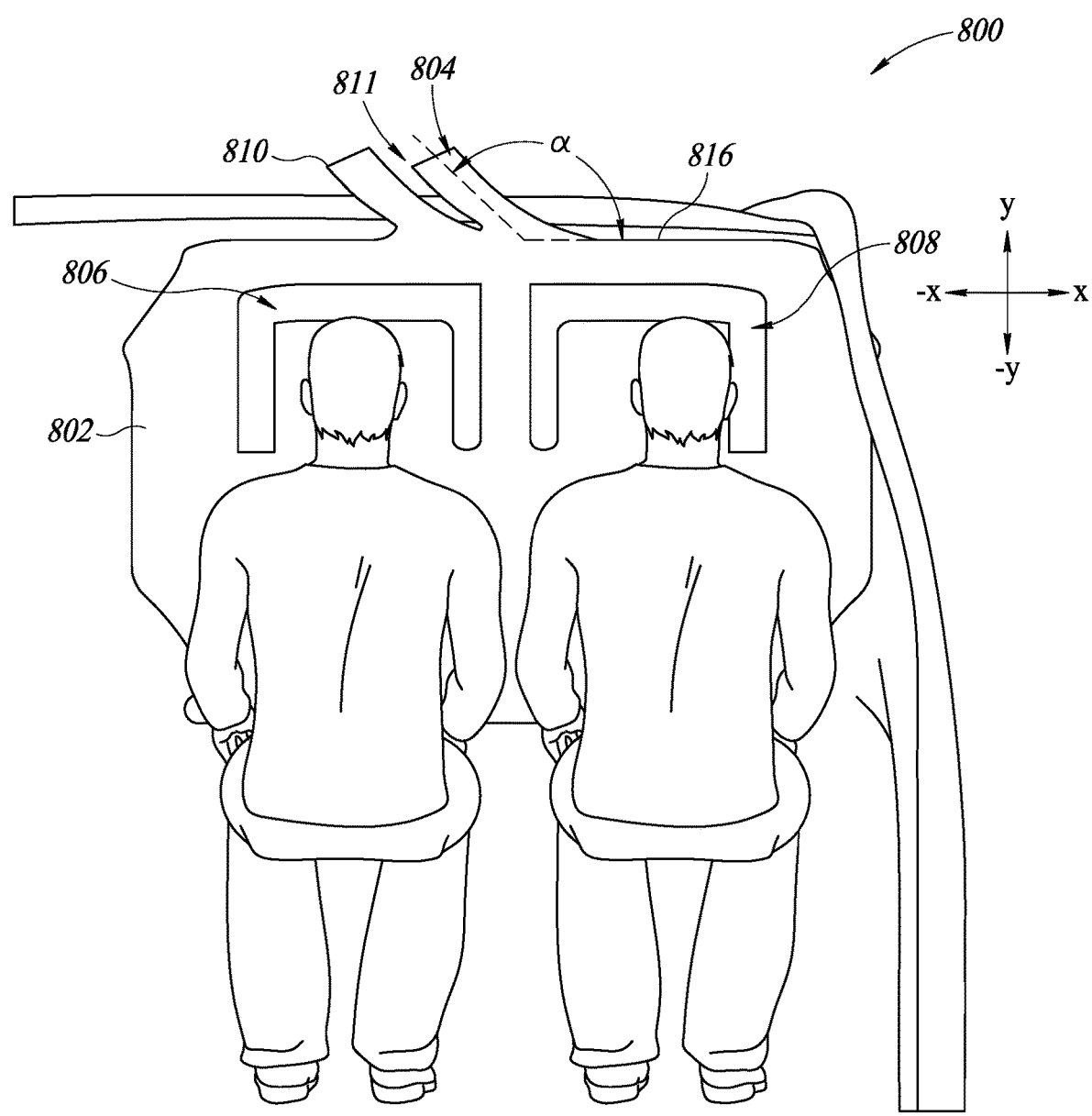
FIG. 13 is a partial rear view of a vehicle from an interior thereof illustrating a deployed airbag according to an embodiment of the present disclosure.

FIG. 13 is a partial rear view of a vehicle 800 from an interior thereof illustrating a deployed airbag 802. The vehicle 800 of FIG. 13 is generally similar to the vehicle 400 of FIG. 7. The vehicle 800 includes an airbag apparatus 811 having an airbag 802, an airbag inlet 804, an inflator (not shown for clarity of description and illustration), a first cavity 806, and a second cavity 808. The airbag apparatus 811 provides certain variations. For example, the airbag apparatus 811 includes a secondary airbag inlet 810 in addition to the airbag inlet 804. The secondary airbag inlet 810 is spaced apart from the airbag inlet 804. As shown in FIG. 13, the airbag inlet 804 and the secondary airbag inlet 810 are each angularly positioned with respect to an upper edge 816 at an angle α. In some embodiments, as shown in FIG. 13, the angle α may be an obtuse angle. In some embodiments, the secondary airbag inlet 810 may inflate the airbag 802 concurrently with the airbag inlet 804. Alternatively, in other embodiments, the secondary airbag inlet 810 may inflate the airbag 802 sequentially with the airbag inlet 804. In general, the secondary airbag inlet 810 may optionally be provided to support fluid communication of a larger volume of gas to the airbag 802.

Figure 14:
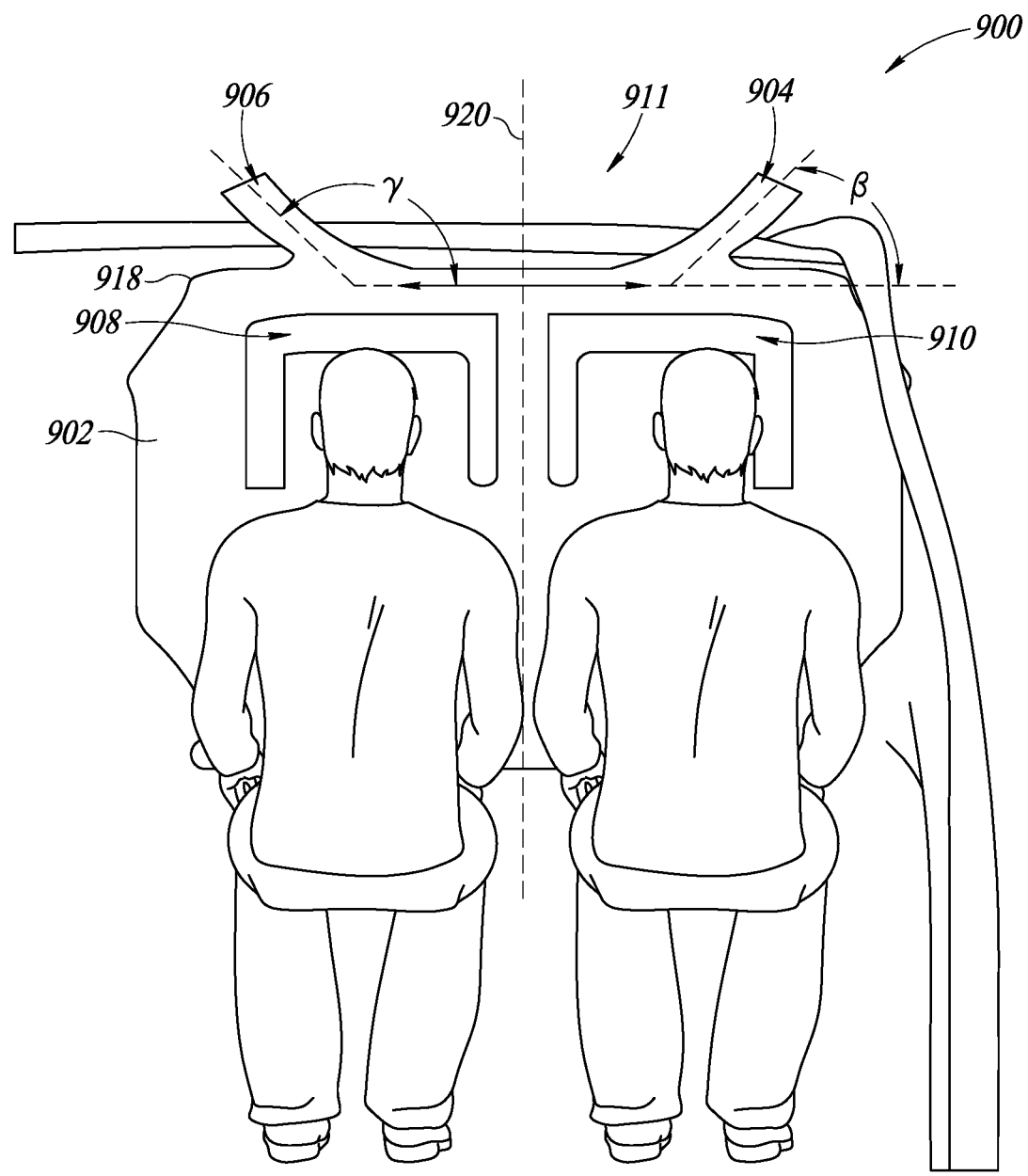
FIG. 14 is a partial rear view of a vehicle from an interior thereof illustrating a deployed airbag according to an embodiment of the present disclosure.

FIG. 14 is a partial rear view of a vehicle 900 from an interior thereof illustrating a deployed airbag 902. The vehicle 900 of FIG. 14 is generally similar to the vehicle 800 of FIG. 13. The vehicle 900 includes an airbag apparatus 911 having an airbag 902, an airbag inlet 904, an inflator (not shown for clarity of description and illustration), a secondary airbag inlet 906, a first cavity 908 and, a second cavity 910. The airbag apparatus 911 provides certain variations. For example, the secondary airbag inlet 906 and the airbag inlet 904 are positioned proximate to opposing ends of the airbag 902. The airbag inlet 904 is angularly oriented at an angle β relative to an upper edge 918 of the airbag 902, where the angle β may be an acute angle. The secondary airbag inlet 906 is angularly oriented at an angle γ relative to the upper edge 918 of the airbag 902, where the angle γ may be an obtuse angle. Moreover, the secondary airbag inlet 906 and the airbag inlet 904 are arranged to be a mirror image of each other relative to a central axis 920.

Figure 15:
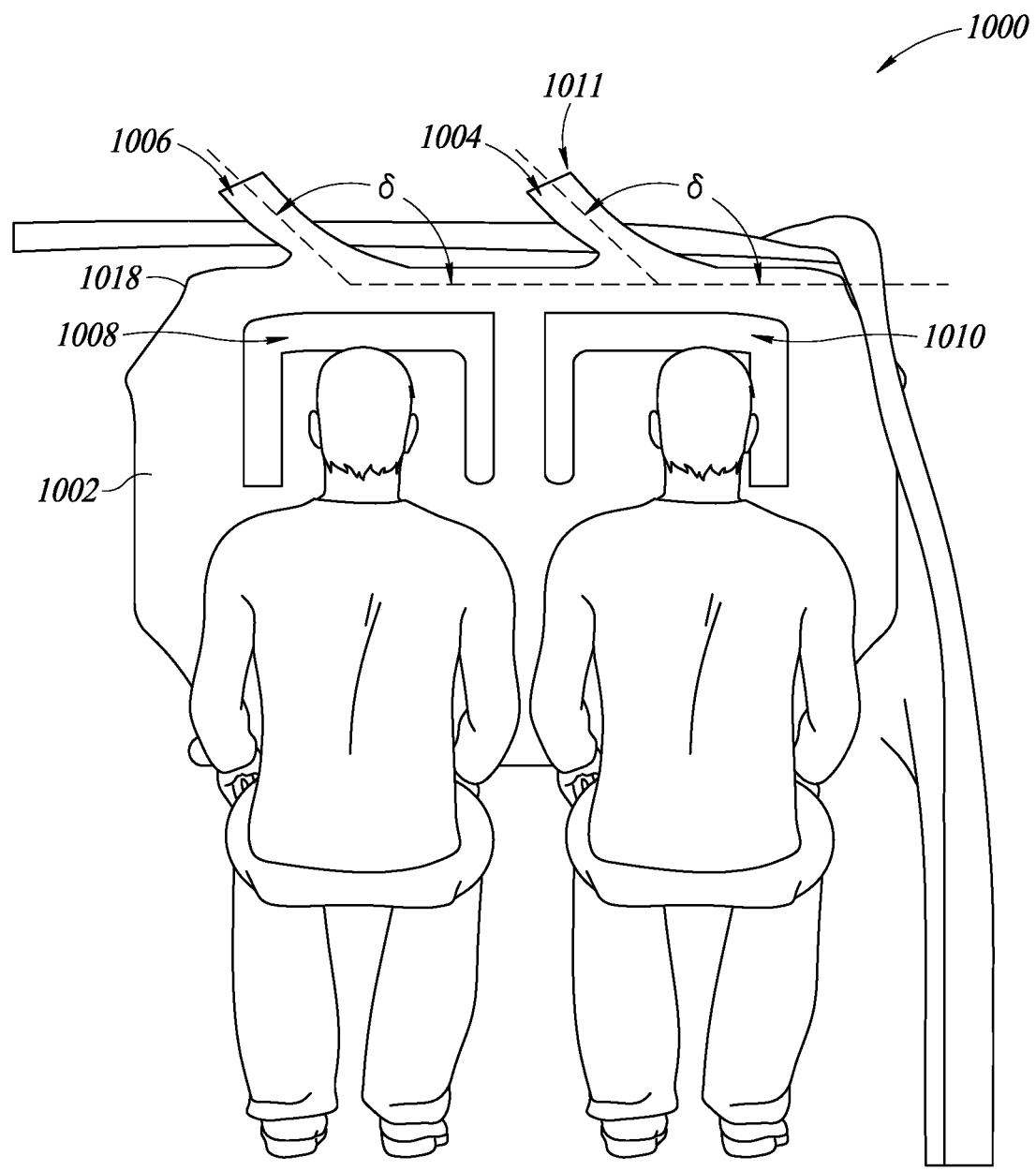
FIG. 15 is a partial rear view of a vehicle from an interior thereof illustrating a deployed airbag according to an embodiment of the present disclosure.

FIG. 15 is a partial rear view of a vehicle 1000 from an interior thereof illustrating a deployed airbag 1002. The vehicle 1000 of FIG. 15 is generally similar to the vehicle 900 of FIG. 14. The vehicle 1000 includes an airbag apparatus 1011 having an airbag 1002, an inflator (not shown for clarity of description and illustration), an airbag inlet 1004, a secondary airbag inlet 1006, a first cavity 1008, and a second cavity 1010. The airbag apparatus 1011 provides certain variations. For example, the secondary airbag inlet 1006 and the airbag inlet 1004 are each positioned proximate to opposing ends of the deployed and inflated airbag 1002. The airbag inlet 1004 and the secondary airbag inlet 1006 are each angularly oriented at an angle δ relative to an upper edge 1018 of the airbag 1002, where the angle δ may be an obtuse angle.

Figure 16:
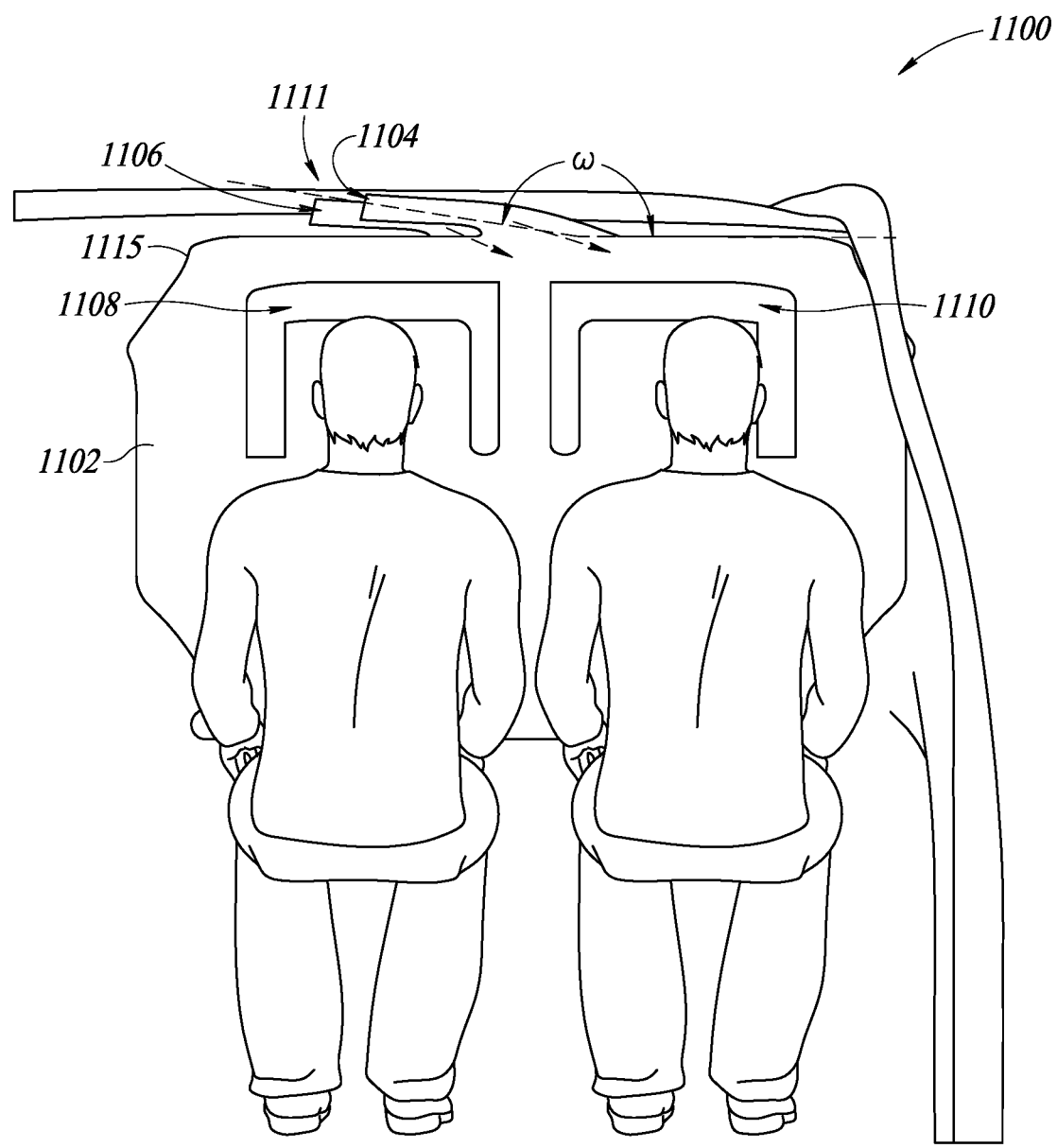
FIG. 16 is a partial rear view of a vehicle from an interior thereof illustrating a deployed airbag according to an embodiment of the present disclosure.
Figure 17:
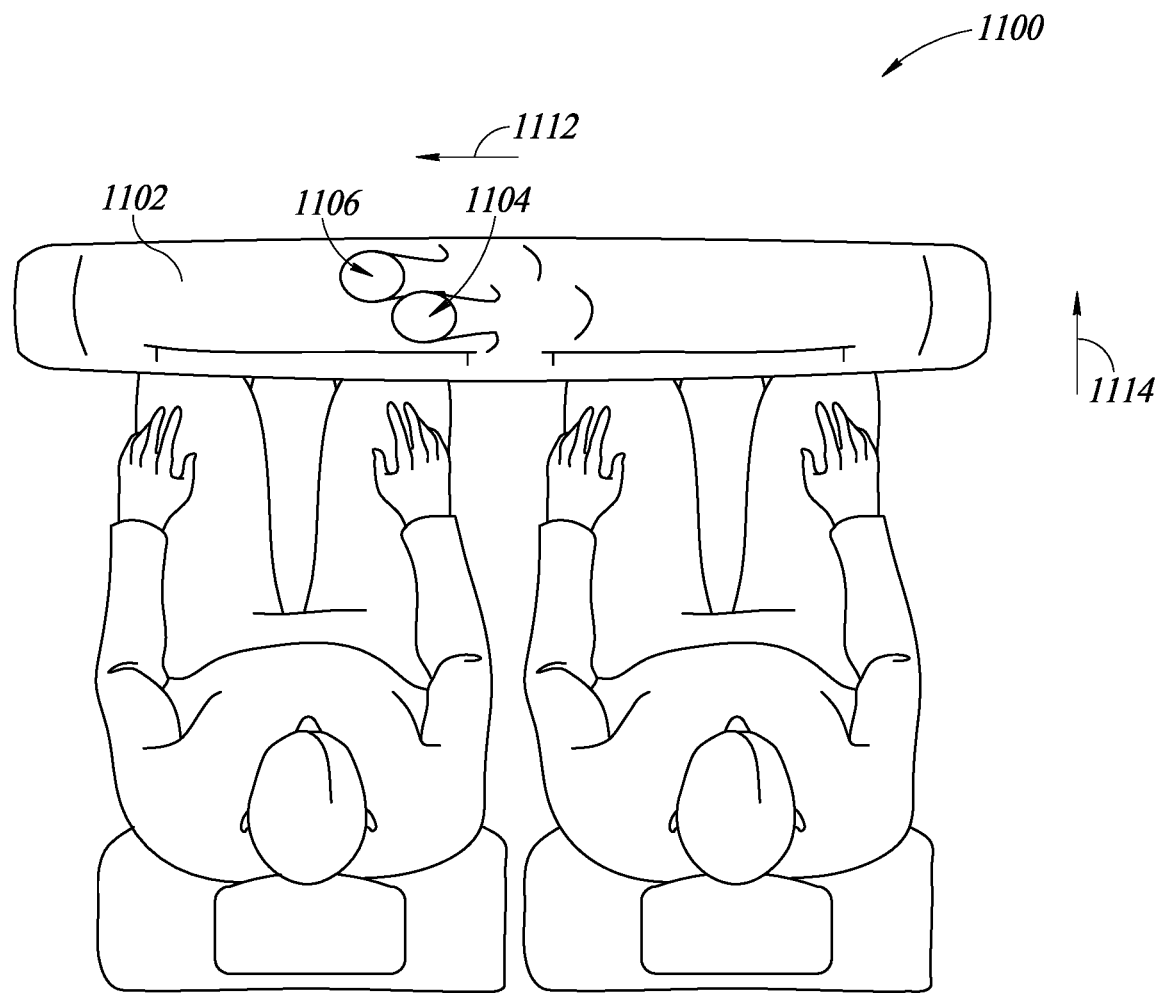
FIG. 17 is a partial top view of the vehicle from an interior thereof and a roof and an instrument panel removed for clarity of illustration and description, illustrating the deployed airbag of FIG. 16.

FIGS. 16 and 17 are a partial rear view and a partial top view, respectively, of a vehicle 1100 from an interior thereof illustrating a deployed airbag 1102, with the roof 120 and the instrument panel 108 removed for clarity of illustration and description in FIG. 17. The vehicle 1100 of FIGS. 16 and 17 is generally similar to the vehicle 1000 of FIG. 15. The vehicle 1100 includes an airbag apparatus 1111 having an airbag 1102, an inflator (not shown for clarity of description and illustration), an airbag inlet 1104, a secondary airbag inlet 1106, a first cavity 1108 and, a second cavity 1110. The airbag apparatus 1111 provides certain variations. For example, the airbag inlet 1104 is spaced apart from the secondary airbag inlet 1106 in a first direction 1112 and a second direction 1114. Both the airbag inlet 1104 and the secondary airbag inlet 1106 are angularly oriented at an angle co relative to an upper edge 1115 of the airbag 1102, where the angle co may, in some embodiments, be an obtuse angle.

Figure 18:
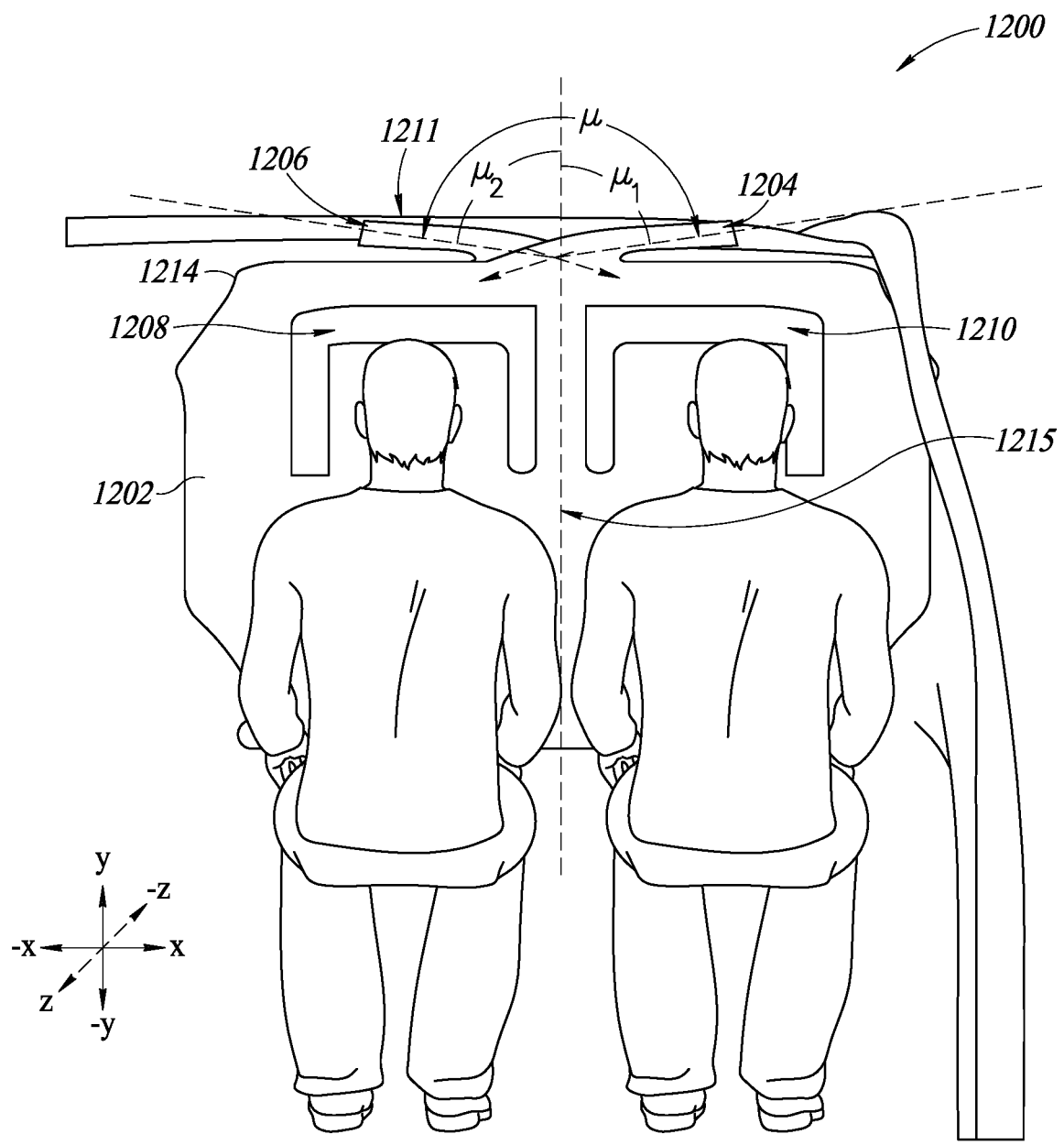
FIG. 18 is a partial rear view of a vehicle from an interior thereof illustrating a deployed airbag according to an embodiment of the present disclosure.
Figure 19:
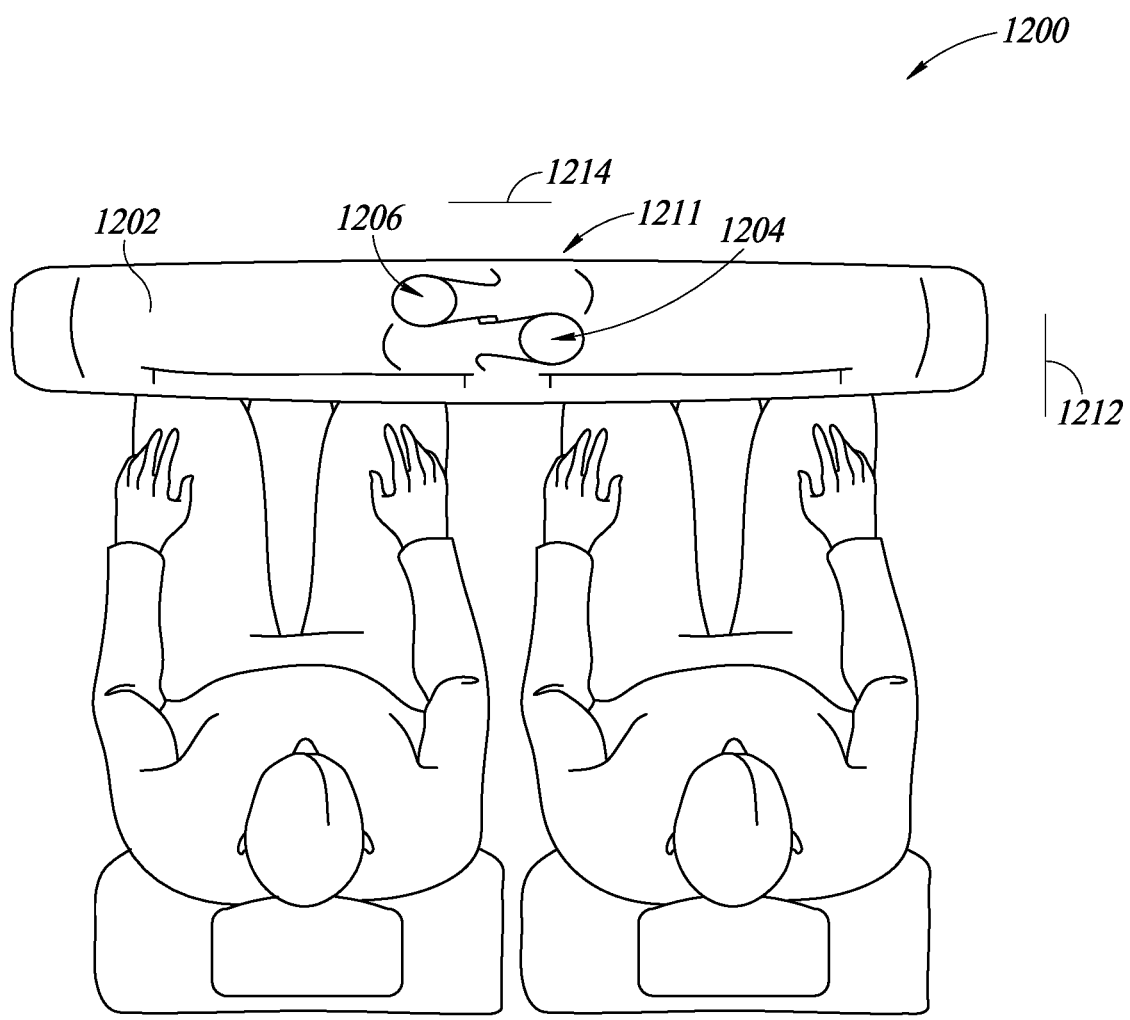
FIG. 19 is a partial top view of the vehicle from an interior thereof and a roof removed for clarity of illustration and description, illustrating the deployed airbag of FIG. 18.

FIGS. 18 and 19 are a partial rear view and a partial top view, respectively, of a vehicle 1200 from an interior thereof illustrating a deployed airbag 1202, with the roof 120 and the instrument panel 108 removed for clarity of illustration and description in FIG. 19. The vehicle 1200 of FIGS. 18 and 19 is generally similar to the vehicle 1100 of FIGS. 16 and 17. For example, the vehicle 1200 includes an airbag apparatus 1211 having an airbag 1202, an inflator (not shown for clarity of description and illustration), an airbag inlet 1204, a secondary airbag inlet 1206, a first cavity 1208 and, a second cavity 1210. The airbag apparatus 1211, however, provides certain variations. For example, the airbag inlet 1204 is angularly oriented relative to a central axis 1215 of the airbag apparatus 1210 at an angle $\mu_1$ and the secondary airbag inlet 1206 is angularly oriented relative to the central axis 1215 at an opposing angle $\mu_2$. Moreover, the airbag inlet 1204 is spaced apart from a secondary airbag inlet 1206 in a first direction 1212 and a second direction 1214.

Moreover, the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. A vehicle, comprising:
a longitudinal axis of the vehicle and a cross-vehicle axis of the vehicle, the cross-vehicle axis of the vehicle being perpendicular to the longitudinal axis of the vehicle;
a roof;
an instrument panel;
a first seat and a second seat arranged cross-vehicle along the cross-vehicle axis of the vehicle; and
an airbag apparatus mounted to the roof, the airbag apparatus having:
an inflator; and
an airbag that is fluidly coupled to the inflator, the airbag being inflatable and deployable from the roof between the first and second seat and the instrument panel to a deployed position;
the airbag in the deployed position having an outer periphery, a vehicle-rearward face, a vehicle-forward face, and a cavity that extends through the vehicle-rearward face and the vehicle-forward face, the cavity being spaced from the outer periphery and defining at least one central portion of the airbag, the vehicle-rearward face and the vehicle-forward face being spaced from each other along the longitudinal axis of the vehicle;
the cavity including a first portion elongated cross-vehicle, a second portion extending downwardly from the first portion, and a third portion extending downwardly from the first portion spaced cross-vehicle from the second portion;
the first portion of the cavity being positioned vehicle-forward of the first seat in a direction perpendicular to the cross-vehicle axis and the first portion of the cavity being positioned vehicle-forward of the second seat in a direction perpendicular to the cross-vehicle axis; and
the at least one central portion being positioned vehicle-forward of both the first seat and the second seat.

2. The vehicle as set forth in claim 1, wherein the first seat and the second seat are both positioned between the second portion and the third portion along the cross-vehicle axis.

3. The vehicle of claim 1, wherein the at least one central portion of the airbag is positioned to face heads of passengers of the first seat and the second seat in the deployed position.

4. The vehicle of claim 1, wherein the at least one central portion is one central portion elongated from the second portion to the third portion of the cavity and positioned vehicle-forward of both seats.

5. The vehicle of claim 1, wherein the cavity includes a fourth portion extending downwardly from the first portion between the second portion and the third portion, the at least one central portion including a first central portion extending from the first portion of the cavity to the second portion of the cavity vehicle-forward of the first seat, and the at least one central portion including a second central portion extending from the second portion of the cavity to the third portion of the cavity vehicle-forward of the second seat.

6. The vehicle of claim 1, wherein the cavity includes a fourth portion extending downwardly from the first portion between the second portion and the third portion, the at least one central portion including a first central portion between the first portion of the cavity and the second portion of the cavity vehicle-forward of the first seat, and the at least one central portion including a second central portion between the second portion of the cavity and the third portion of the cavity vehicle-forward of the second seat.

7. The vehicle of claim 6, wherein the cavity includes a fifth portion extending downwardly from the first portion between the second portion and the fourth portion of the cavity, and a center lip portion between the fourth portion and the fifth portion of the cavity.

8. The vehicle of claim 7, wherein the first central portion extends from the second portion of the cavity to the fourth portion of the cavity, the central lip extends from the fourth portion of the cavity to the fifth portion of the cavity, and the second central portion extends from the fifth portion of the cavity to second portion of the cavity.

9. The vehicle of claim 1 wherein the outer periphery is defined by a lateral width and a longitudinal width sized to cover a head, a torso, and a neck of passengers of the first seat and the second seat.

10. The vehicle of claim 1, further comprising a secondary inflator.

11. The vehicle of claim 10, wherein the secondary inflator is inflatable concurrently with the inflator.

12. The vehicle of claim 10, wherein the secondary inflator is inflatable sequentially with the inflator.

13. A vehicle, comprising:
a roof;
an instrument panel;
a first seat and a second seat arranged cross-vehicle; and
an airbag apparatus mounted to the roof, the airbag apparatus having:
an inflator; and
an airbag that is fluidly coupled to the inflator, the airbag being inflatable and deployable from the roof between the first and second seat and the instrument panel to a deployed position;
the airbag in the deployed position having an outer periphery, a vehicle-rearward face, a vehicle-forward face, and a cavity that extends through the vehicle-rearward face and the vehicle-forward face, the cavity being spaced from the outer periphery and defining at least one central portion of the airbag;
the cavity including a first portion elongated cross-vehicle, a second portion extending downwardly from the first portion, and a third portion extending downwardly from the first portion spaced cross-vehicle from the second portion, the first portion positioned vehicle-forward of both the first seat and the second seat;
the at least one central portion being positioned vehicle-forward of both the first seat and the second seat; and
the first seat and the second seat both being positioned between the second portion and the third portion along a cross-vehicle axis.

14. The vehicle of claim 13, wherein the at least one central portion of the airbag is positioned to face heads of passengers of the first seat and the second seat in the deployed position.

15. The vehicle of claim 13, wherein the at least one central portion is one central portion elongated from the second portion to the third portion of the cavity and positioned vehicle-forward of both seats.

16. The vehicle of claim 13, wherein the cavity includes a fourth portion extending downwardly from the first portion between the second portion and the third portion, the at least one central portion including a first central portion extending from the first portion of the cavity to the second portion of the cavity vehicle-forward of the first seat, and the at least one central portion including a second central portion extending from the second portion of the cavity to the third portion of the cavity vehicle-forward of the second seat.

17. The vehicle of claim 13 wherein the outer periphery is defined by a lateral width and a longitudinal width sized to cover a head, a torso, and a neck of passengers of the first seat and the second seat.

18. The vehicle of claim 13, further comprising a secondary inflator that is inflatable concurrently with the inflator.

19. The vehicle of claim 13, further comprising a secondary inflator that is inflatable sequentially with the inflator.

20. A vehicle, comprising:
a roof;
an instrument panel;
a first seat and a second seat arranged cross-vehicle; and
an airbag apparatus mounted to the roof, the airbag apparatus having:
an inflator; and
an airbag that is fluidly coupled to the inflator, the airbag being inflatable and deployable from the roof between the first and second seat and the instrument panel to a deployed position;
the airbag in the deployed position having an outer periphery, a vehicle-rearward face, a vehicle-forward face, and a cavity that extends through the vehicle-rearward face and the vehicle-forward face, the cavity being spaced from the outer periphery and defining at least one central portion of the airbag;
the cavity including a first portion elongated cross-vehicle, a second portion extending downwardly from the first portion, and a third portion extending downwardly from the first portion spaced cross-vehicle from the second portion, the first portion positioned vehicle-forward of both the first seat and the second seat;
the at least one central portion being positioned vehicle-forward of both the first seat and the second seat;
the cavity including a fourth portion extending downwardly from the first portion between the second portion and the third portion, the at least one central portion including a first central portion between the first portion of the cavity and the second portion of the cavity vehicle-forward of the first seat, and the at least one central portion including a second central portion between the second portion of the cavity and the third portion of the cavity vehicle-forward of the second seat; and
the cavity including a fifth portion extending downwardly from the first portion between the second portion and the fourth portion of the cavity, and a center lip portion between the fourth portion and the fifth portion of the cavity.

* * * * *